(12) United States Patent
Parrott (10) Patent No.: US 8,117,234 B2
(45) Date of Patent: Feb. 14, 2012

(54) METHOD AND APPARATUS FOR REDUCING STORAGE REQUIREMENTS OF ELECTRONIC RECORDS

(75) Inventor: Neil D. Parrott, Laguna Niguel, CA (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 12/018,881

(22) Filed: Jan. 24, 2008

(65) Prior Publication Data

US 2009/0192977 A1    Jul. 30, 2009

(51) Int. Cl.
*G06F 17/30* (2006.01)
(52) U.S. Cl. ...................................... 707/802
(58) Field of Classification Search ........................ None
See application file for complete search history.

(56) References Cited

U.S. PATENT DOCUMENTS

| | | | |
|---|---|---|---|
| 5,258,855 | A | 11/1993 | Lech et al. |
| 5,369,508 | A | 11/1994 | Lech et al. |
| 5,617,566 | A | 4/1997 | Malcolm |
| 5,625,465 | A | 4/1997 | Lech et al. |
| 5,768,416 | A | 6/1998 | Lech et al. |
| 6,094,505 | A | 7/2000 | Lech et al. |
| 6,643,648 | B1 | 11/2003 | Ross et al. |
| 2002/0087510 | A1* | 7/2002 | Weinberg et al. ................ 707/1 |
| 2004/0215998 | A1* | 10/2004 | Buxton et al. .................... 714/2 |
| 2005/0086241 | A1 | 4/2005 | Ram et al. |
| 2007/0027974 | A1* | 2/2007 | Lee et al. ...................... 709/223 |
| 2007/0073565 | A1 | 3/2007 | D'Heedene et al. |

OTHER PUBLICATIONS

Qingbo Zhu, Windsor W. Hsu, "Fossilized Index: The Linchpin of Trustworthy Non-Alterable Electronic Records", SIGMOD '05, Jun. 14-16, 2005, pp. 395-406.
Soumyadeb Mitra, Windsor W. Hsu, Marianne Winslett, "Trustworthy Keyword Search for Regulatory-Compliant Records Retention", VLDB '06, Sep. 12-15, 2006, pp. 1001-1012.
"COLD Handbook", Version 4.1, International Business Machines Corporation, Nov. 2007.

* cited by examiner

*Primary Examiner* — Mohammad Ali
*Assistant Examiner* — Syed H Hasan
(74) *Attorney, Agent, or Firm* — Elissa Wang; SVL, IP Law; Edell, Shapiro & Finnan, LLC (57) ABSTRACT

An embodiment of the present invention includes a system for storage of electronic records. The system includes a storage unit to store records and a processing system to store and retrieve records from the storage unit. The processing system receives non-exception based records and stores the records in the storage unit. This is accomplished by storing unique information from each received non-exception based record within the storage unit separately from information common to a plurality of non-exception based records. The stored unique information is linked with the stored common information. The present invention embodiments further include a method and a program product apparatus for storing electronic records as described above.

18 Claims, 6 Drawing Sheets

METHOD AND APPARATUS FOR REDUCING STORAGE REQUIREMENTS OF ELECTRONIC RECORDS

BACKGROUND OF THE INVENTION

1. Technical Field

The present invention embodiments pertain to data management and storage. In particular, embodiments of the present invention pertain to a system and method that store records by associating unique record information with a single instance of data commonly residing within one or more of the records. This reduces the storage requirements of the records since the common data is not repeatedly stored for each record.

2. Discussion of Related Art

Electronic records management systems are employed by various organizations or entities, and store a collection of data for each record managed by the systems. The records may be generated by various processes including business processes, where records generated by the business processes in the course of conducting business transactions may include various data items (e.g., process version details, terms and conditions, contract details, product information, customer or user information, etc.). Generally, the business processes repeatedly perform the same transaction for many different customers or users. Consequently, a substantial portion of data within the records generated by these transactions is common across transaction instances. Since the electronic records management systems store the generated transaction records, the same information is repeatedly stored for each record by those systems, thereby needlessly consuming additional storage space.

In addition, organizations revise their core business processes and records management policies in order to comply with regulatory requirements. These revisions generally increase the volume of electronic records that are generated (e.g., including records with common data) and placed into medium to long term storage, and tend to further contribute to the needless consumption of additional storage space.

SUMMARY

Accordingly, an embodiment of the present invention includes a system for storage of electronic records. The system includes a storage unit to store records and a processing system to store and retrieve records from the storage unit. The processing system receives non-exception based records and stores the records in the storage unit. This is accomplished by storing unique information from each received non-exception based record within the storage unit separately from information common to a plurality of non-exception based records. The stored unique information is linked with the stored common information. The present invention embodiments further include a method and a program product apparatus for storing electronic records as described above.

The above and still further features and advantages of the present invention will become apparent upon consideration of the following detailed description of example embodiments thereof, particularly when taken in conjunction with the accompanying drawings wherein like reference numerals in the various figures are utilized to designate like components.

DETAILED DESCRIPTION OF THE PREFERRED EMBODIMENTS

The present invention embodiments are directed towards reducing the storage requirements for electronic records, preferably those that contain common data or information, and are non-exception based (e.g., generated from transactions or processes that comply with predefined business or other parameters, service level agreements (SLAs) and/or processing requirements). Since a direct correlation exists between the quantity of electronic records generated and the amount of data stored in an electronic records management system (ERM), the present invention embodiments enable a reduction in the total amount of data generated and stored for these types of electronic records. In particular, the present invention embodiments capture a subset of the total information within the electronic record and store the captured information in a unique record object (URO). The captured information subset includes information unique to the particular record (e.g., customer information, date or time stamp, product or service identifier, etc.). The remaining record information (e.g., process description, product information, service level agreements, terms and conditions etc.) is common to a plurality of records and is stored once in a template record object (TRO). The unique record object (or unique record information) is linked or associated with the corresponding template record object (or common record information), where the association or linking information is stored within and maintained by a record information object (RIO).

With respect to records generated from transactions or processes that fall outside of pre-defined business or other parameters, service level agreements (SLAs) and/or processing requirements (e.g., transactions that generate exceptions or are exception based), the present invention embodiments capture a complete and detailed record of the entire transaction including the exception conditions and circumstances. This produces a larger electronic record. However, since most organizations seek to minimize process exceptions, the volume of larger exception based records should be minimized.

The present invention embodiments substantially reduce electronic record storage requirements for non-exception based records, especially for organizations that: generate and store high volumes of electronic records as a result of their core business processes and/or operations; generate and store large quantities of records containing common information; conduct business according to documented and audited procedures in order to meet regulatory and compliance requirements; and/or require cost effective near-term storage and associated benefits (e.g., fast access to large quantities of electronic records).

Figure 1:
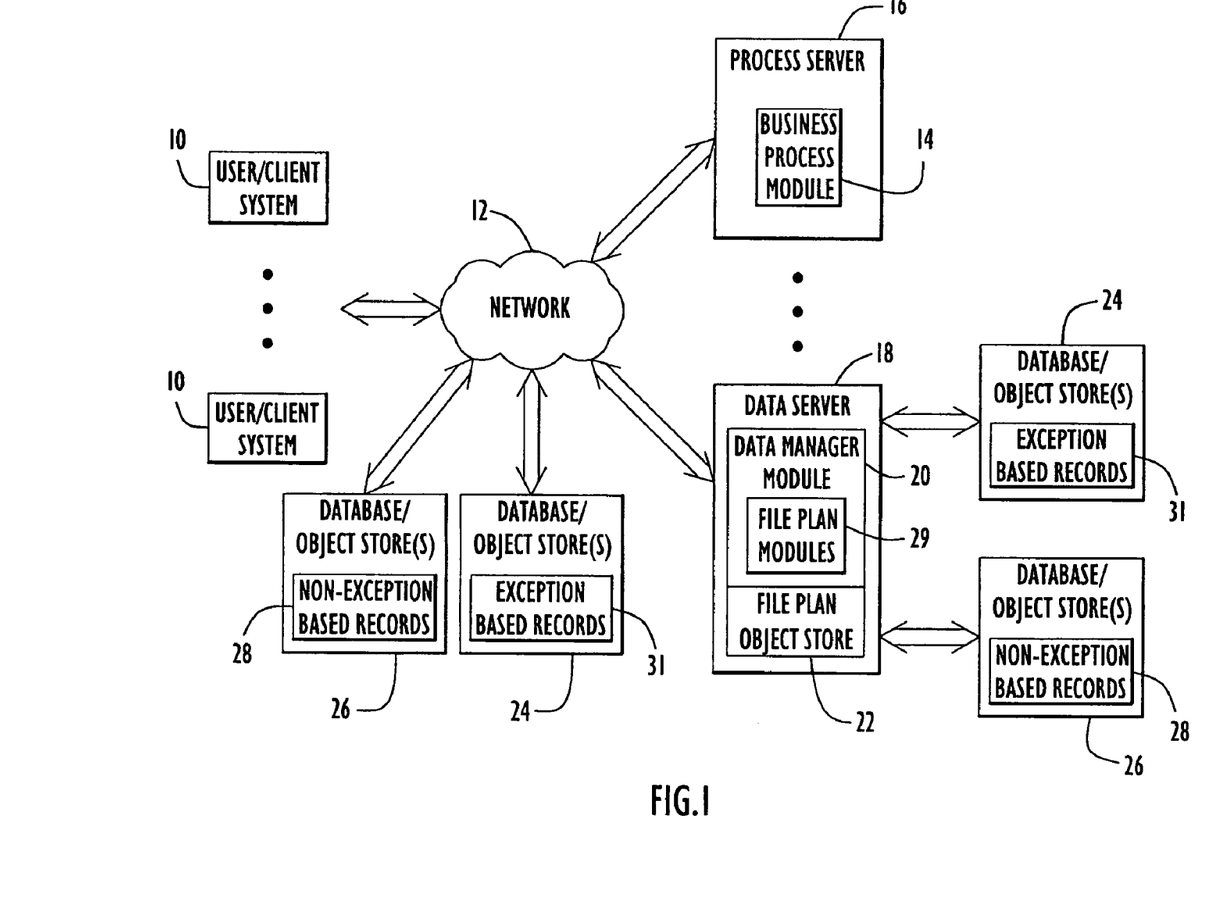
FIG. 1 is a diagrammatic illustration of an exemplary system topology for storage of electronic records according to an embodiment of the present invention.

An example system for storing electronic records according to an embodiment of the present invention is illustrated in FIG. 1. Specifically, the system includes one or more end-user or client systems 10, a network 12, one or more process servers 16, one or more data servers 18, one or more databases or object stores 24, and one or more databases or object stores 26. The end-user and server systems may be implemented by any conventional or other computer systems preferably equipped with a display or monitor, a base (e.g., including the processor, memories and/or internal or external communications devices (e.g., modem, network cards, etc.)) and optional input devices (e.g., a keyboard, mouse or other input device).

End-user systems 10 are coupled to process server 16 via network 12, while the process server may similarly access data server 18 over the network. Network 12 may be implemented by any quantity of any suitable communications media (e.g., WAN, LAN, Internet, Intranet, etc.). End-user systems 10 and server systems 16, 18 may be local to or remote from each other. By way of example only, process server system 16 may include a business process application or module 14. The business process module typically provides a user interface to enable a user to conduct a business or other transaction from end-user system 10. The transaction further enables storage and/or retrieval of records within databases 24, 26 as described below. However, the process server may include any desired modules to perform or implement various processes (e.g., workflows, content management, business or other transactions, etc.) that conduct record generation, processing and/or storage.

Data server 18 includes a data manager module 20 and a file plan object store 22. The data manager module includes a series of file plan modules 29 and facilitates storage and retrieval of electronic records within databases 24, 26 as described below. Database or object store 24 generally stores complete record information for exception based records 31 produced from transactions generating an exception (e.g., a transaction that does not comply with desired conditions). In this case, the entire record is captured and stored in a corresponding database 24 as described below. Database or object store 26 stores non-exception based records 28 produced from compliant transactions (e.g., a transaction that complies with desired conditions) in accordance with present invention embodiments as described below. These records contain common information, and are placed in database 26 by storing information unique to each record separate from the common information as described below. File plan object store 22 includes a file plan that indicates the manner in which to store information within databases 24, 26. The databases and server systems 16, 18 may be local to or remote from each other. Further, the databases and object stores may be implemented by any quantity of any conventional or other database, object store or storage structure (e.g., databases, files, data structures, etc.).

The business process module, data manager module, file plan modules and file plan object store may be implemented by any combination of software and/or hardware modules or units. The data manager module and file plan modules may be embedded within any portions of any suitable data or content management system (e.g., records management or other application, etc.). The data server, under software control (e.g., data manger module, file plan modules and file plan object store), basically implement the embodiments of the present invention. The software for the present invention embodiments (e.g., data manager module, file plan modules, file plan object store, etc.) may be available on a recordable medium (e.g., magnetic, optical, floppy, DVD, CD, within a memory device or program storage unit, etc.), or in the form of a carrier wave or signal for downloading from a source via a communication medium (e.g., bulletin board, network, WAN, LAN, Intranet, Internet, etc.).

Figure 2:
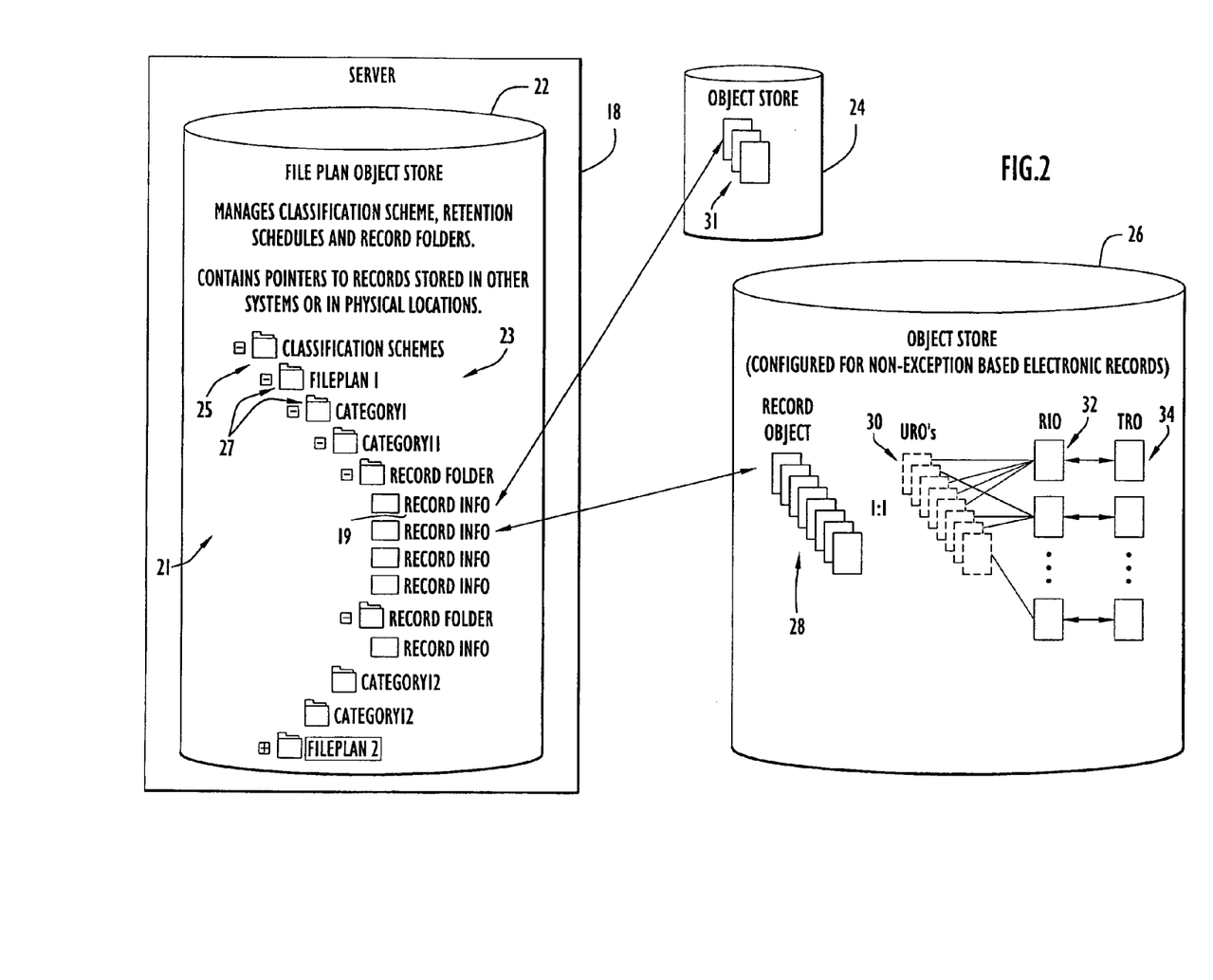
FIG. 2 is a diagrammatic illustration of the data server of FIG. 1 in communication with object stores according to an embodiment of the present invention.
Figure 3:
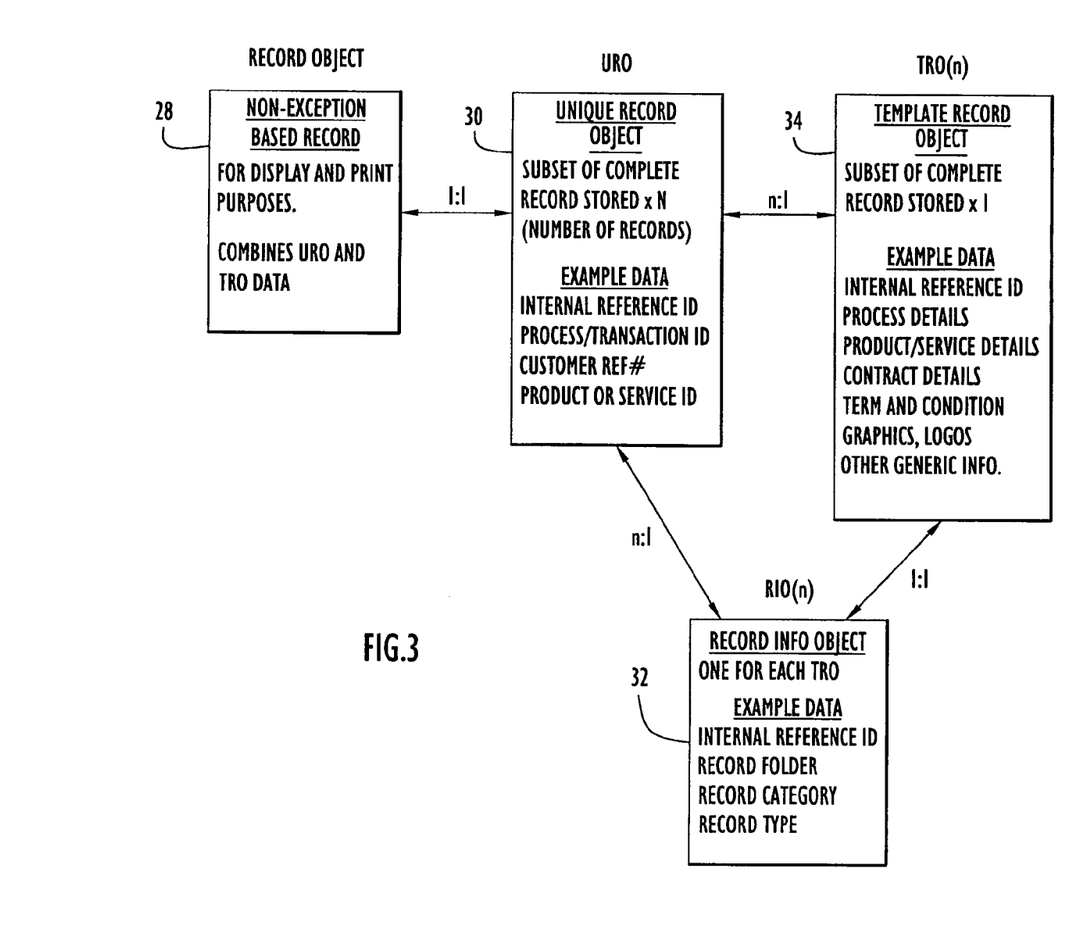
FIG. 3 is an example schema for associating unique record data with corresponding templates of common record data according to an embodiment of the present invention.

Referring to FIGS. 2-3, file plan object store 22 includes a file plan 21 indicating the manner in which to store records. The file plan includes a hierarchical or directory structure 23 including tiers of folders 25 and subordinate tiers of sub-folders 27 to receive record information. Data manager module 20 includes file plan modules 29, each associated with a corresponding folder and/or subfolder, to store records from those folders and/or sub-folders in a particular prescribed manner. In other words, different manners of processing and storing records may be assigned among folders 25 and/or sub-folders 27.

When a record is produced from a process or transaction, data manager module 20 determines the appropriate folder and/or sub-folder within the file plan to accommodate the record. This may be accomplished based on business or process criteria and/or metadata associated with the record, folder and/or sub-folder. For example, one of the criteria may indicate that all non-exception based records associated with a dollar amount less than a predetermined value are to be placed in a particular folder. Once record information is placed in a folder and/or subfolder of structure 23, the file plan module associated with that folder and/or sub-folder stores the record in a corresponding database 24 or 26 in accordance with the prescribed manner assigned to that folder and/or subfolder.

File plan modules 29 associated with folders and/or sub-folders for exception based records store the entire record within a corresponding database or object store 24 as described below. However, file plan modules 29 associated with folders and/or sub-folders for non-exception based records store unique and common information within records separately in order to reduce the storage requirements for those records. Accordingly, database or object store 26 includes one or more unique record objects 30 to store the unique record information, one or more record information objects (RIO) 32 to link the separately stored unique and common record information, and one or more template record objects (TRO) 34 to store the common record information. In particular, template record objects 34 each include information commonly contained within a plurality or group of records or record objects 28. The common information includes the same information stored in each record that is repeatedly generated by a business or other process. For example, the common information may include the same information generated from a business or other transaction conducted for different customers or users (e.g., process details or description, product and/or service details, contract details, terms and conditions, service level agreements, graphics, logos and other generic information pertinent to record keeping or other policies). This information is preferably in the form of text, but may include images. The template record objects each further include a TRO internal reference identifier to uniquely identify that template record object. The TRO identifier may include any quantity of any suitable alphanumeric or other characters or symbols, and may be generated by any conventional or other techniques (e.g., random generation, formulas or calculations, sequential ordering, various identifiers corresponding to system and/or storage addresses/locations, etc.). A single template record object 34 is stored within database or object store 26 for each group or plurality of records 28 containing the common information.

Unique record objects 30 each include information unique to a corresponding record or record object 28. In other words, this information includes remaining information within the record not contained in a corresponding template record object 34. For example, the unique information may include different information generated from a business or other transaction conducted for different customers or users (e.g., process/transaction identification, customer reference identifier, customer information, product or service identifier, date/time, etc.). This information is preferably in the form of text. The unique record objects each further include a URO internal reference identifier to uniquely identify that unique record object. The URO identifier may include any quantity of any suitable alphanumeric or other characters or symbols, and may be generated by any conventional or other techniques (e.g., random generation, formulas or calculations, sequential ordering, various identifiers corresponding to system and/or storage addresses/locations, etc.). A unique record object 30 is stored in database or object store 26 for each record 28. Alternatively, unique record objects 30 may be stored within the corresponding folders and/or sub-folders of file plan 21 determined for the records by data manager module 20.

Record information objects (RIO) 32 each store information linking the unique information of records (within unique record objects 30) to their corresponding common information (within template record objects 34). A single record information object 32 is associated with and stored in database or object store 26 for each template record object 34. By way of example, the linking information stored within each record information object may include the URO identifiers of one or more unique record objects, the TRO identifier of the corresponding template record object, the record folder within file plan 21 determined for the record, the record category and the record type. The record information objects each further include an RIO internal reference identifier to uniquely identify that record information object. The RIO identifier may further be placed in the corresponding template record object to provide a link from the template record object to the record information object. The RIO identifier may include any quantity of any suitable alphanumeric or other characters or symbols, and may be generated by any conventional or other techniques (e.g., random generation, formulas or calculations, sequential ordering, various identifiers corresponding to system and/or storage addresses/locations, etc.). The combination of unique record object 30 and corresponding template record object 34 basically enable re-creation or formation of a corresponding record 28 (e.g., for display, print and/or audit purposes). Since template record objects 34 or common information are stored once for a group of records 28, the storage requirements for those records are significantly reduced.

Figure 4:
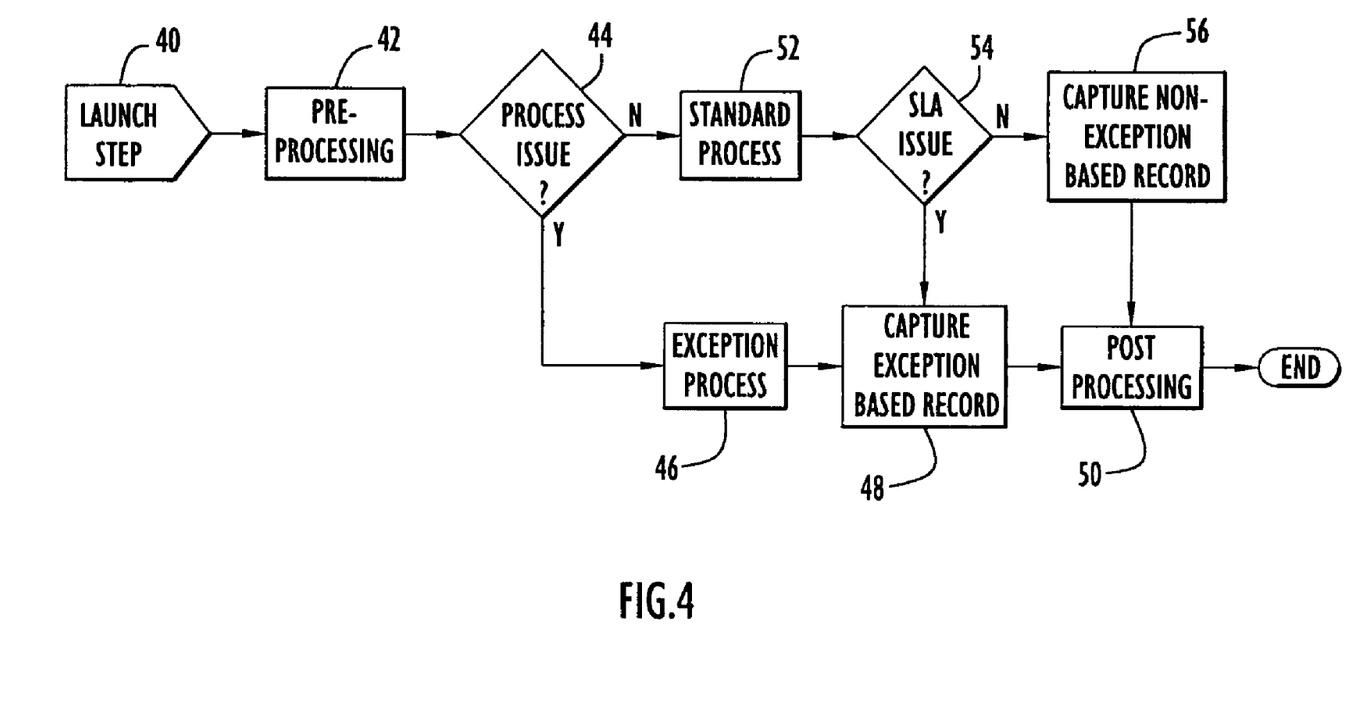
FIG. 4 is a procedural flow chart illustrating the manner in which electronic records are captured for an example transaction according to an embodiment of the present invention.
Figure 5:
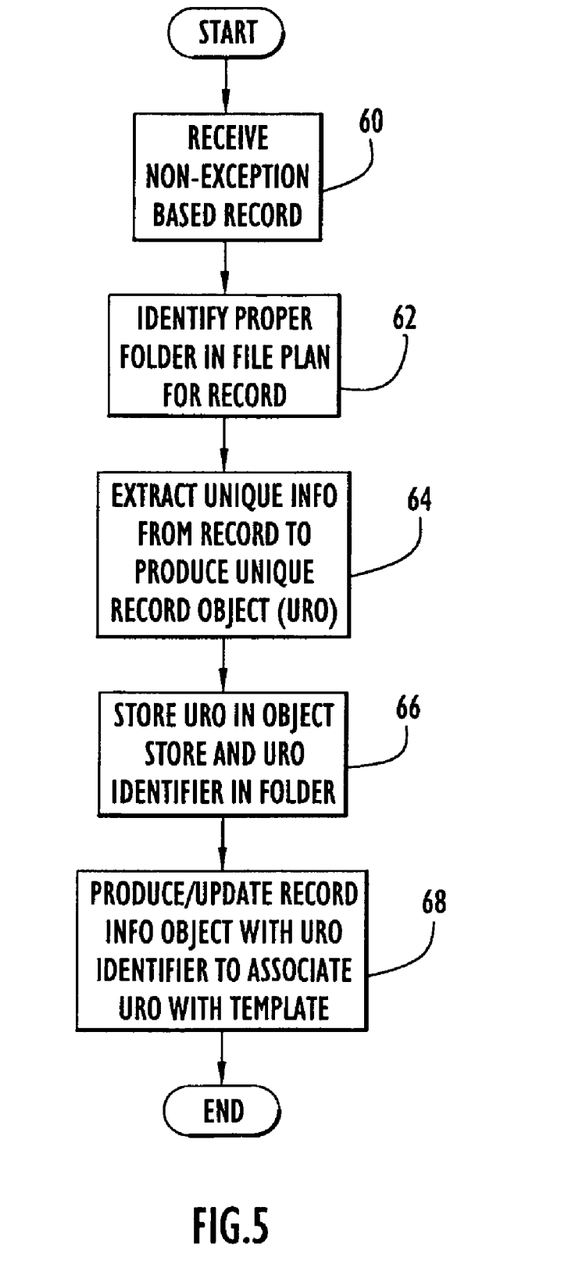
FIG. 5 is a procedural flow chart illustrating the manner in which non-exception based electronic records are stored according to an embodiment of the present invention.
Figure 6:
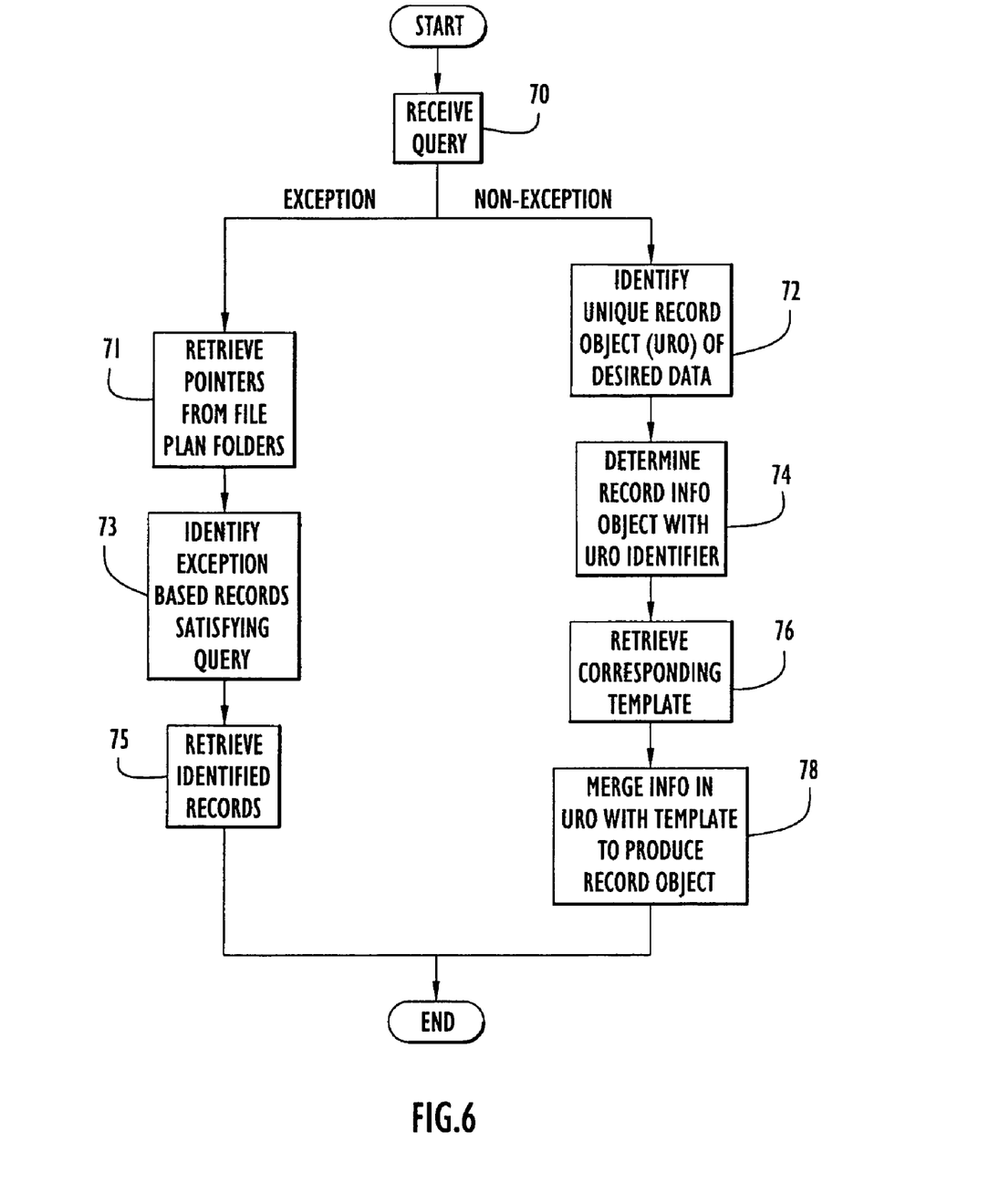
FIG. 6 is a procedural flow chart illustrating the manner in which electronic records are retrieved according to an embodiment of the present invention.

The manner in which records are handled according to an embodiment of the present invention is illustrated in FIGS. 4-6. Initially, template record objects 34 are created and pre-stored in databases or object stores 26 (FIG. 1). The template record objects may be created based on process information (e.g., standard transaction details, service level agreement details, etc.) and/or content information (e.g., contract information, terms and conditions, product and/or service descriptions, graphics, logos, etc.). Since the record format or information for transactions are known, the information common to the records may be pre-stored in the template record objects and associated with folders and/or sub-folders in file plan 21 (and/or record metadata (e.g., record types and categories)). The system may generate the TRO identifiers for the template record objects upon insertion into databases 26, and may further produce record information objects 32 (including the TRO and RIO identifiers) based on the association of the template record objects to the file plan folders and/or sub-folders (and/or record metadata). New versions of template record objects 34 and record information objects 32 are created in response to revision of the standard process definition (e.g., change in parameters, processes, SLAs, terms and conditions, etc.) and/or common content. Prior versions of template record objects 34 and record information objects 32 may be removed in response to the absence of unique record objects associated with those prior versions.

Specifically, an end-user utilizing an end-user system 10 accesses process server 16 via network 12 to perform a business or other transaction conducted by business process module 14 at step 40 (FIG. 4). The process server may conduct any suitable transaction or activity employing storage and/or retrieval of records (e.g., content management activities, business activities, transactions, applications for credit, policies or services, etc.).

Business process module 14 (FIG. 1) provides a user interface to enable a user to interact and conduct a transaction at step 42. Basically, business process module 14 processes user-entered and/or other information to determine compliance of the transaction with various parameters or conditions. However, this determination may be accomplished by data manager module 20 in the record capture steps described below. If an exception occurs (e.g., the transaction does not comply with the parameters or conditions) as determined at step 44, the exception is processed at step 46 in accordance with exception handling procedures. For example, if the user applies for a service or purchases a product and the business process module determines that the service or product is to be denied (e.g., user does not qualify, insufficient payment, etc.), an exception is raised and appropriate procedures for these conditions are followed (e.g., denying service, aborting the purchase, etc.).

An exception based record 31 from the transaction is generated and captured at step 48. In particular, data manager module 20 receives exception based record 31 from process server 16 and determines the appropriate folder and/or sub-folder within file plan 21 for the record. This may be accomplished based on business or process criteria and/or metadata (e.g., record type, record category, etc.) associated with the record, folder and/or sub-folder as described above. A file plan module 29 associated with the determined folder and/or sub-folder stores the exception based record (e.g., including the unique and common information within the record) in database or object store 24, while a pointer 19 (FIG. 2; e.g., identifier, address, etc.) to the stored record is placed within the determined folder or sub-folder. The business process module further performs post processing or transaction tasks (e.g., notifying the user of further consideration for the transaction, denial of the service or product, etc.) at step 50.

When an exception does not occur (e.g., the transaction complies with the parameters or conditions) as determined at step 44, the transaction is processed at step 52 in accordance with process procedures. Further, the transaction may be examined for compliance with service level agreements (SLAs) depending upon the particular transaction conducted. If the transaction does not comply with the service level agreements (e.g., a user does not agree to the terms, etc.) as determined at step 54, an exception based record 31 from the transaction is generated and captured at step 48, and post processing is performed at step 50 as described above.

However, when the transaction complies with the service level agreement as determined at step 54, a non-exception based record 28 is generated and captured at step 56. Referring to FIG. 5, data manager module 20 receives non-exception based record 28 (FIG. 1) from process server 16 at step 60 and determines the appropriate folder and/or subfolder within file plan 21 (FIG. 2) for the record at step 62. This may be accomplished based on business or process criteria and/or metadata (e.g., record type, record category, etc.) associated with the record, folder and/or sub-folder as described above. A file plan module 29 associated with the determined folder and/or sub-folder stores the non-exception based record in database or object store 26. In particular, the file plan module extracts the unique information from record object 28 (e.g., remaining information in the record other than the common information stored in an associated template record object, such as process/transaction identification, customer reference identifier, customer information, product or service identifier, date/time, etc.) and produces unique record object 30 at step 64. The unique record object includes a URO identifier generated by the file plan module and the extracted information. Since the template record objects are pre-stored and associated with file plan folders, file plan modules 29 know the information to extract from a received record and the particular template record object (and its associated TRO identifier) associated with a folder.

The file plan module stores the generated unique record object in object store 26 (FIG. 1) and places a pointer 19 to the unique record object in the determined folder at step 66. Further, the file plan module produces or updates the record information object corresponding to template record object 34 associated with the determined folder at step 68. Specifically, the file plan module ascertains the record information object from the RIO identifier within the associated template record object, and places the URO identifier of the generated unique record object in the ascertained record information object to link the unique record object with the template record object.

In the case where no record information object 32 exists for template record object 34 associated with the determined folder, file plan module 29 may generate record information object 32. The record information object preferably includes record information (e.g., record folder, category and type), the RIO identifier described above, and the TRO identifier of template record object 34 associated with the determined folder and containing the common information. The file plan module places the URO identifier of the generated unique record object within the record information object, and may further place the RIO identifier of the record information object in the template record object associated with the determined folder. The identifiers of the unique record object, record information object and template record object enable linking of these items.

Once received non-exception based record 28 is stored, the business process module further performs post processing or transaction tasks (e.g., notifying the user of completion of the transaction, confirming purchase of the service or product, etc.) at step 50 (FIG. 4).

The system may receive records from various sources for storage in object stores 24, 26 in the manners described above. For example, records may be imported from another system (e.g., in a batch or stream mode) or entered by a user. In these cases, record metadata (e.g., record category, type, folder, etc.) are utilized to determine the status of a record as exception or non-exception based. Once a record is characterized as exception or non-exception based, the record is stored in the corresponding manner described above (e.g., unique and common information of exception based records are stored together in object stores 24, while unique and common information of non-exception based records are stored separately in object stores 26).

Business process module 14 may need to retrieve exception and non-exception based records during a business or other process. The manner in which these types of records are retrieved according to an embodiment of the present invention is illustrated in FIG. 6. Initially, data manager module 20 may receive a query for records within object stores 24, 26 at step 70. With respect to exception based records, the data manager module retrieves pointers 19 from the file plan folders and/or sub-folders associated with exception based records at step 71 and identifies records satisfying query conditions at step 73. Since exception based records 31 contain the unique and common record information, the identified exception based records are retrieved from corresponding object stores 24 at step 75.

For non-exception based records, the data manager module retrieves pointers 19 from the file plan folders and/or sub-folders associated with non-exception based records, and accesses unique record objects 30 to identify those satisfying query conditions at step 72. Unique record objects 30 may alternatively be stored directly within corresponding file plan folders and/or sub-folders to enable identification of unique record objects satisfying the query without retrieval of those records from object stores 26. Since record information objects 32 include the URO identifiers of associated unique record objects as described above, the URO identifiers of the unique record objects satisfying the query are utilized to determine the corresponding record information objects at step 74. Basically, the record information objects are searched to identify those record information objects containing the URO identifiers of the unique record objects satisfying the query. The identified record information objects each include a TRO identifier that indicates a corresponding template record object 34. The identified unique record objects and their corresponding record template objects are subsequently retrieved from object stores 26 at step 76. The information from unique record objects 30 satisfying the query and their corresponding template record objects 34 are merged or combined at step 78 to reproduce non-exception based record objects 28 (FIG. 2) for display, print or other purposes (e.g., updating/modification, etc.).

The present invention embodiments may be implemented as a new system, or as part of an existing system (e.g., content management, workflow, etc.). By way of example, a series of Application Programming Interfaces (API) of an existing system may be modified, or a new set of APIs or other modules may be created for the new or existing systems, to handle activities and record maintenance (e.g., converting or defining documents as records, adding records, updating records, freezing and unfreezing records, exporting records, deleting records, record relocation, copy, file, extract, creation/modification of links, etc.) of non-exception based records according to present invention embodiments. These operations generally perform the same functions as with conventional records; however, the one or more components (e.g., URO, RIO and TRO) of the non-exception based records are manipulated to achieve the desired result. For example, deletion of a non-exception based record includes deletion of the unique record object (and the URO identifier in the record information object). The corresponding template record object (and record information object) generally remain in the object store until no unique record objects exist that are associated with that template record object (and record information object).

Copy or relocation functions may copy or move the unique record, record information and/or template record objects, and further update the URO, RIO and/or TRO identifiers to maintain the link or associations. Freeze and unfreeze operations may lock and unlock (e.g., enable and prevent access to) the unique record objects since the corresponding template record objects may be needed for other (unlocked) unique record objects. Moreover, the unique and template record objects may be combined as described above to reproduce the non-exception based record for operations where the original record is utilized (e.g., exportation, extraction, etc.). Operations including addition of records (e.g., converting or defining records, adding, etc.) may create or manipulate unique record objects, record information objects and template record objects in substantially the same manners described above (e.g., FIGS. 4-5).

An update operation for a non-exception based record includes updating information in the unique record object. For example, a business or other process may retrieve a non-exception based record in the manner described above for FIG. 6. A user may modify the retrieved information for re-submission to the process, where the modified record is re-evaluated by the process (e.g., due to the changed information) to determine an exception or non-exception based status. An exception based record may be treated as a new record and processed and stored in object store 24 as described above for FIG. 4. The previous record is retained in accordance with a retention procedure associated with the file plan folder containing that record (e.g., retaining the record for a predetermined time interval and moving to long term storage or deleting, etc.).

When the modified record is determined to be a non-exception based record, the non-exception based record may be treated as a new record and processed and stored in object store 26 as described above for FIG. 5. The previous record is retained in accordance with a retention procedure associated with the file plan folder containing that record (e.g., retaining the record for a predetermined time interval and moving to long term storage or deleting, etc.).

In addition, unique record objects 30 (e.g., and record information objects 32) may be stored redundantly in another storage device or object store in order to provide fault tolerance and data recovery. In this case, known common information may be reproduced in case of data or system failure, and the maintained unique record information may be combined with the reproduced common information to recover non-exception based record objects. The redundant storage of unique record objects (e.g., and record information objects) utilizes reduced storage space since the unique information (and not the entire record) is redundantly stored.

It will be appreciated that the embodiments described above and illustrated in the drawings represent only a few of the many ways of implementing a method and apparatus for reducing storage requirements of electronic records.

The environment of the present invention embodiments may include any quantity of end-user systems, server systems and databases or object stores. The end-user and server systems employed by the present invention embodiments may be implemented by any quantity of any personal or other type of computer system (e.g., IBM-compatible, Apple, Macintosh, laptop, palm pilot, etc.), and may include any commercially available operating system (e.g., Windows, OS/2, Unix, Linux, etc.) and any commercially available or custom software (e.g., browser software, communications software, server software, data manager module, file plan modules, business process module, file plan object store, etc.). These systems may include any types of monitors and input devices (e.g., keyboard, mouse, voice recognition, etc.) to enter and/or view information.

It is to be understood that the software (e.g., data manager module, file plan modules, etc.) for the computer systems of the present invention embodiments (e.g., server systems, etc.) may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the end-user and server systems. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a recordable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The communication network may be implemented by any quantity of any type of communications network (e.g., LAN, WAN, Internet, Intranet, VPN, etc.). The computer systems of the present invention embodiments (e.g., end-user systems, server systems, etc.) may include any conventional or other communications devices to communicate over the network via any conventional or other protocols. The computer systems (e.g., end-user system, server system, etc.) may utilize any type of connection (e.g., wired, wireless, etc.) for access to the network.

The databases and object stores may be implemented by any conventional or other databases, object stores or storage structures (e.g., files, databases, data structures, etc.). The databases may be remote from or local to each other, the end-user systems and/or the server systems. The object stores may store exception based and non-exception based records either individually, or in any combinations. Any desired criteria, parameters and/or information may be utilized to determine the status of a process, transaction instance and/or record as exception or non-exception based depending upon the particular application (e.g., business parameters, service level agreements, transaction parameters, etc.). The file plan modules may be invoked based on any suitable conditions (e.g., placement of a record within a file plan folder, etc.). The file plan may be arranged in any fashion (e.g., directory, list, etc.) and include any quantity of tiers, where any portion may be associated with a particular manner of storage. The manner of storage for each file plan portion may be indicated in any fashion (e.g., execution of scripts and/or modules, indicated by text or other types of files, etc.). The pointers may include any suitable identifiers (e.g., addresses, locations, etc.) to identify the location of records or unique record objects.

The records handled by the present invention embodiments may be of any quantity, size or type, and may include any quantity of information in any suitable forms (e.g., text, images, audio, graphics, video, multimedia, documents, etc.).

The template record object, record information object and unique record object may include any quantity of any information (e.g., common, unique, customer information, transaction information, metadata, etc.) in any suitable forms (e.g., text, images, graphics, audio, video, multimedia, etc.) and arranged in any fashion. These record objects may be implemented by any quantity of suitable data structures (e.g., records, arrays, linked lists, etc.). The TRO, RIO and URO identifiers may include any quantity of any desired characters or symbols, and may be generated in any fashion (e.g., calculations, sequential ordering, concatenation of various attributes, etc.).

The unique record objects may be stored within an object store or other storage and/or within the file plan folders and/or sub-folders. Any quantity of unique record objects may be utilized to store unique information of one or more records. The record information objects may be stored in any suitable locations (e.g., within an object store or other storage, etc.). Any quantity of record information objects may be utilized for one or more template record objects. Alternatively, the unique record objects may include direct links to the corresponding template record objects (e.g., the system may be utilized without the record information objects).

The template record objects may be stored in any suitable locations (e.g., within an object store or other storage, etc.). Any quantity of template record objects may be utilized to store common information of one or more records. The unique record, record information and/or template record objects may be linked or associated via any conventional or other techniques in any fashion (e.g., pointers, identifiers, storage locations, etc.). The various identifiers (e.g., URO, TRO, RIO) may be stored in one or more of these objects to accomplish the linking or association. The information to store within the unique record objects and template record objects may be determined in any fashion, where each unique and template record object associated with a record may include any portions of unique and/or common record information. The information or metadata may include any desired characteristics or attributes (e.g., categories, types, etc.), and be stored in any of the record objects (e.g., URO, RIO, TRO) or other storage.

Any of the record objects (e.g., URO, RIO, TRO) with unique information may be stored in one or more other storage devices, preferably remote from the system, in order to recover data in case of data loss. The storage devices may be implemented by any conventional or other storage devices (e.g., databases, memories, files, CD, DVD, computer systems, etc.). The common information may be reproduced (since this information is generic and known) and combined with the redundantly stored unique information to reproduce the records.

The various record operations may be selectively performed, where the template record, unique record and/or record information objects may be manipulated in any fashion. The updating operation for exception and non-exception based records may alternatively be performed by overwriting the previous record version (e.g., overwriting modified portions of an exception based record, overwriting a unique record object of a non-exception based record, etc.).

The present invention embodiments may employ any quantity of user interface screens or other user interfaces, where the screens may include any information arranged in any fashion. The screens may include any quantity of any types of input or actuation mechanisms (e.g., buttons, icons, fields, boxes, links, etc.) disposed at any locations to enter/display information and initiate desired actions.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, data structures, APIs, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system for present invention embodiments and suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is to be understood that the present invention embodiments are not limited to the applications disclosed herein, but may be utilized for any suitable transaction or process (e.g., business, content or data management, workflow, etc.). Further, the present invention embodiments may store records in the manners described above based on any status or characterization of the records (e.g., exception and non-exception based, etc.) determined from any desired conditions, parameters and/or criteria, where the status may be indicated by any suitable indicator within or associated with the record (e.g., metadata, flag or status indicator, etc.). The criteria may enable all records to be characterized the same and be processed in the same manner (e.g., all records characterized and processed as non-exception based, etc.). Moreover, exception based records may be stored in the manner of non-exception based records, where exception information may be stored in the unique record object.

From the foregoing description, it will be appreciated that the invention makes available a novel method and apparatus for reducing storage requirements of electronic records, wherein data storage requirements are reduced for electronic records satisfying pre-defined business parameters and/or process criteria by storing unique record information separately from common record information.

Having described preferred embodiments of a new and improved method and apparatus for reducing storage requirements of electronic records, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for storage of electronic records comprising:
a first storage unit to store non-exception based records, wherein said non-exception based records are generated from processes complying with predefined conditions;
a second storage unit to store exception based records, wherein said exception based records are generated from processes that are non-compliant with said predefined conditions; and
a processing system to store and retrieve records from said first and second storage units, said processing system including:
a data manager module to receive non-exception and exception based records and to store said received non-exception based records in said first storage unit by storing unique information from each received non-exception based record within said first storage unit separately from information common to a plurality of non-exception based records and linking said stored unique information with said stored common information, wherein said first storage unit includes a plurality of template record objects each containing said information common to a plurality of non-exception based records and a record information object for each said template record object to link unique record information to that template record object, and wherein said data manager module includes:
an exception module to store information of each exception based record within said second storage unit;
an extraction module to extract said unique information from each received non-exception based record and produce a unique record object with said extracted information and an identifier uniquely identifying said produced unique record object; and
a link module to place said identifier within said record information object associated with a corresponding template record object to link said unique information of said received non-exception based record with corresponding common information of that record.

2. The system of claim 1, wherein said processing system further includes:
a retrieval module to receive a query and selectively provide records from said first storage unit satisfying said query.

3. The system of claim 2, wherein said retrieval module selectively provides records from said second storage unit satisfying said query.

4. The system of claim 1, wherein said data manager module further includes:
a data recovery module to redundantly store said produced unique record objects to enable recovery of said non-exception based records.

5. The system of claim 1, wherein said data manager module further includes:
a deletion module to selectively delete a non-exception based record stored in said first storage unit by deleting a corresponding unique record object and associated link and selectively deleting at least one of an associated record information object and template record object in response to the absence of an associated unique record object.

6. A system for storage of electronic records comprising:
a first storage unit to store records; and
a processing system to store and retrieve said records from said first storage unit, said processing system including:
a data manager module to receive non-exception based records and to store said received records in said first storage unit by storing unique information from each received non-exception based record within said first storage unit separately from information common to a plurality of non-exception based records and linking said stored unique information with said stored common information, wherein said first storage unit includes a plurality of template record objects each containing said information common to a plurality of non-exception based records and a record information object for each said template record object to link unique record information to that template record object, and wherein said data manager module includes:
an extraction module to extract said unique information from each received non-exception based record and produce a unique record object with said extracted information and an identifier uniquely identifying said produced unique record object; and
a link module to place said identifier within said record information object associated with a corresponding template record object to link said unique information of said received record with corresponding common information of that record; and
a retrieval module to receive a query and selectively provide records from said first storage unit satisfying said query, wherein said retrieval module includes:
a query module to examine said produced unique record objects and identify those record objects with said unique record information satisfying said query;
a template module to identify said record information objects associated with said identified unique record objects to determine template record objects corresponding to said identified unique record objects; and
a record module to combine said unique information of said identified unique record objects with said common information of said corresponding template record objects to produce non-exception based records satisfying said query.

7. A method of storing electronic records comprising:
storing information common to a plurality of non-exception based records in a first storage unit, wherein said non-exception based records are generated from processes complying with predefined conditions;
storing unique information of each non-exception based record within said first storage unit separately from said common information, wherein said storing said common information includes storing within said first storage unit a plurality of template record objects each containing said information common to said plurality of non-exception based records and a record information object for each said template record object to link unique record information to that template record object, and said storing said unique information includes extracting said unique information from each non-exception based record and producing a unique record object with said extracted information and an identifier uniquely identifying said produced unique record object;

linking said stored unique information with said stored common information to enable storage of a single instance of said common information for said plurality of non-exception based records and reduce storage requirements for those records, wherein said linking includes placing said identifier within said record information object associated with a corresponding template record object to link said unique information of said non-exception based record with corresponding common information of that record; and storing information of each exception based record within a second storage unit, wherein exception based records are generated from processes that are non-compliant with said predefined conditions.

8. The method of claim 7, further including:
selectively providing records from said first storage unit satisfying a query.

9. The method of claim 8, wherein said selectively providing records further includes:
selectively providing records from said second storage unit satisfying said query.

10. The method of claim 7, further including:
redundantly storing said produced unique record objects to enable recovery of said non-exception based records.

11. The method of claim 7, further including:
selectively deleting a non-exception based record stored in said first storage unit by deleting a corresponding unique record object and associated link and selectively deleting at least one of an associated record information object and template record object in response to the absence of an associated unique record object.

12. A method of storing electronic records comprising:
storing information common to a plurality of non-exception based records in a first storage unit;
storing unique information of each non-exception based record within said first storage unit separately from said common information, wherein said storing said common information includes storing within said first storage unit a plurality of template record objects each containing said information common to said plurality of non-exception based records and a record information object for each said template record object to link unique record information to that template record object, and said storing said unique information includes extracting said unique information from each non-exception based record and producing a unique record object with said extracted information and an identifier uniquely identifying said produced unique record object;
linking said stored unique information with said stored common information to enable storage of a single instance of said common information for said plurality of non-exception based records and reduce storage requirements for those records, wherein said linking includes placing said identifier within said record information object associated with a corresponding template record object to link said unique information of said non-exception based record with corresponding common information of that record; and
selectively providing records from said first storage unit satisfying a query, wherein said selectively providing records further includes:
examining said produced unique record objects and identifying those record objects with said unique record information satisfying said query;
identifying said record information objects associated with said identified unique record objects to determine template record objects corresponding to said identified unique record objects; and
combining said unique information of said identified unique record objects with said common information of said corresponding template record objects to produce non-exception based records satisfying said query.

13. A program product apparatus including a computer usable medium with computer program logic recorded thereon for storing electronic records, said program product apparatus comprising:
a data manager module to receive non-exception and exception based records and to store said received non-exception based records in a first storage unit by storing unique information from each received non-exception based record within said first storage unit separately from information common to a plurality of non-exception based records and linking said stored unique information with said stored common information, wherein said non-exception based records are generated from processes complying with predefined conditions and said exception based records are generated from processes that are non-compliant with said predefined conditions, wherein said first storage unit includes a plurality of template record objects each containing said information common to a plurality of non-exception based records and a record information object for each said template record object to link unique record information to that template record object, and wherein said data manager module includes:
an extraction module to extract said unique information from each received non-exception based record and produce a unique record object with said extracted information and an identifier uniquely identifying said produced unique record object; and
a link module to place said identifier within said record information object associated with a corresponding template record object to link said unique information of said received non-exception based record with corresponding common information of that record; and
an exception module to store information of each exception based record within a second storage unit.

14. The program product apparatus of claim 13, further including:
a retrieval module to receive a query and selectively provide records from said first storage unit satisfying said query.

15. The program product apparatus of claim 14, wherein said retrieval module selectively provides records from said second storage unit satisfying said query.

16. The program product apparatus of claim 13, wherein said data manager module further includes:
a data recovery module to redundantly store said produced unique record objects to enable recovery of said non-exception based records.

17. The program product apparatus of claim 13, wherein said data manager module further includes:
a deletion module to selectively delete a non-exception based record stored in said first storage unit by deleting a corresponding unique record object and associated link and selectively deleting said at least one of an associated record information object and template record object in response to the absence of an associated unique record object.

18. A program product apparatus including a computer usable medium with computer program logic recorded thereon for storing electronic records, said program product apparatus comprising:
   a data manager module to receive non-exception based records and to store said received records in a first storage unit by storing unique information from each received non-exception based record within said first storage unit separately from information common to a plurality of non-exception based records and linking said stored unique information with said stored common information, wherein said first storage unit includes a plurality of template record objects each containing said information common to a plurality of non-exception based records and a record information object for each said template record object to link unique record information to that template record object, and wherein said data manager module includes:
      an extraction module to extract said unique information from each received non-exception based record and produce a unique record object with said extracted information and an identifier uniquely identifying said produced unique record object; and
      a link module to place said identifier within said record information object associated with a corresponding template record object to link said unique information of said received record with corresponding common information of that record; and
   a retrieval module to receive a query and selectively provide records from said first storage unit satisfying said query, wherein said retrieval module includes:
      a query module to examine said produced unique record objects and identify those record objects with said unique record information satisfying said query;
      a template module to identify said record information objects associated with said identified unique record objects to determine template record objects corresponding to said identified unique record objects; and
      a record module to combine said unique information of said identified unique record objects with said common information of said corresponding template record objects to produce non-exception based records satisfying said query.

* * * * *